Nov. 6, 1928.  
D. F. McGOVERN  
1,690,544  
DETACHABLE SAW TOOTH  
Filed Dec. 6, 1926
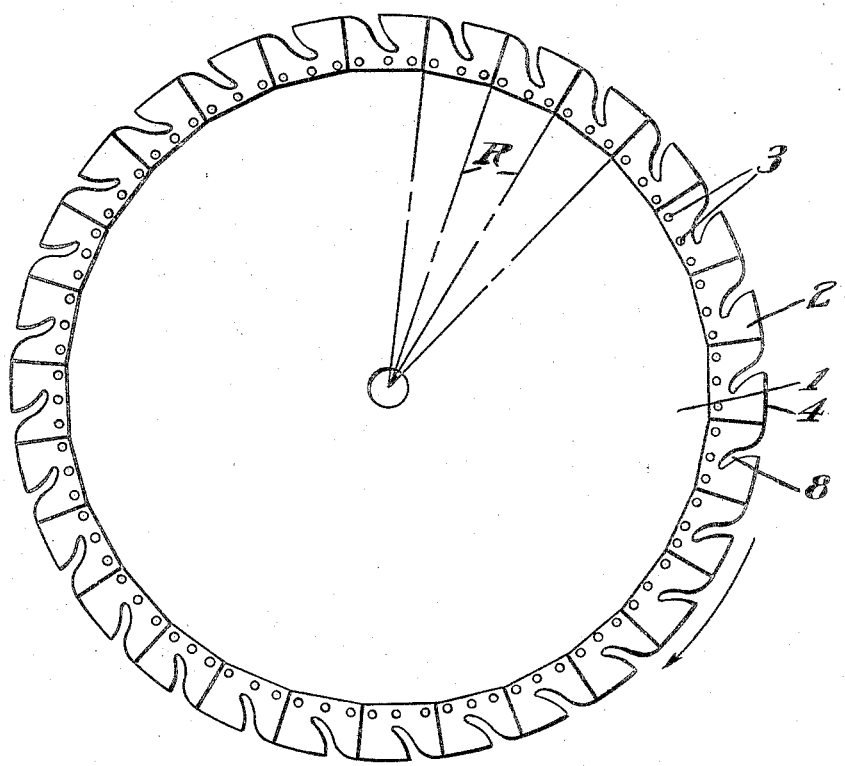
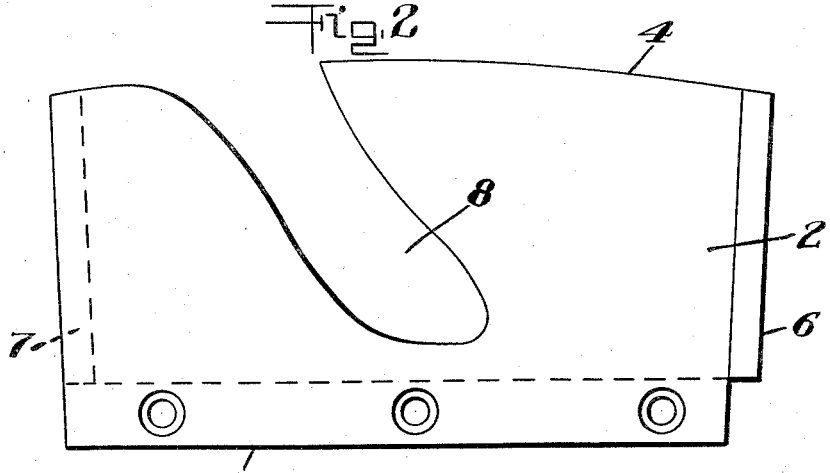
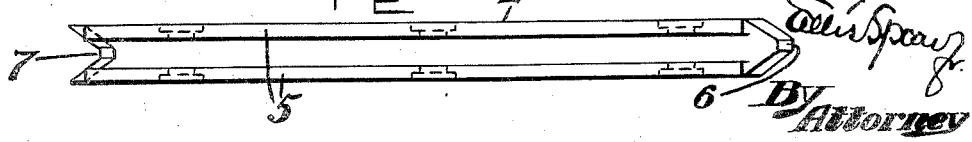
Inventor  
Daniel F McGovern  
By Attorney Patented Nov. 6, 1928.

1,690,544

UNITED STATES PATENT OFFICE.

DANIEL FREDRICK McGOVERN, OF MONTPELIER, VERMONT.

DETACHABLE SAW TOOTH.

Application filed December 6, 1926. Serial No. 152,832.

This invention relates to rotary stone saws of the type wherein the saw blade is equipped with detachable teeth and particularly to the construction and arrangement and relation of such teeth with respect to the saw blade and to each other, to the end that a stronger and more rigid saw of increased cutting efficiency may be produced.

According to prior practice, the saw teeth have been of generally rhomboidal shape so that the back edge of each tooth defined with the forward edge of the next following tooth an abrasive socket which was supposed to trap the abrasive therein during the feed of the saw. As the cutting or peripheral edge of such a tooth wore down, however, this type of tooth proportionately lost its cutting efficiency, due to the fact that the abrasive pocket or trap became shallower and hence could not retain the abrasive in sufficient quantity to maintain maximum cutting efficiency. To remedy this, it has been proposed to provide each tooth with a distinct abrasive pocket opening into the rear edge of the tooth, but inasmuch as the rhomboidal shape of the tooth was retained, this simply accentuated the width of the gap or space between adjacent teeth, with the result that the teeth themselves were weakened and had a greater tendency to lose their alinement and the saw as a whole lacked that peripheral rigidity and stiffness essential in a saw of this kind where vibration and cutting stresses are most pronounced.

To overcome these several disadvantages of prior practice, I have devised my present invention. According to it, the teeth are of generally rectangular form, that is to say, their front and back edges are substantially in rectangular relation to the inner attaching and outer cutting edges of the tooth, and hence there are no definite gaps or spaces between adjacent teeth at the periphery of the saw. This makes for increased strength and rigidity, since there is practically no chance for relative vibration or for relative buckling or disalignment of the individual teeth, the teeth in my saw being preferably interlocked with each other at their front and rear edges and hence presenting practically a solid unbroken cutting edge continuously around the saw blade. Adequate and improved abrasive feed is secured in my saw by providing the cutting edge of each tooth with an abrasive pocket. This is done by definitely notching out each tooth, such notch beginning at the cutting edge of the tooth and extending inwardly towards the attaching edge of the tooth, preferably on lines oblique or substantially oblique to the axis of rotation of the blade and in the general direction of rotation of the blade. This makes for a more certain entrapment of the abrasive in the pocket and permits a freer feed thereof to the cutting edge of the tooth.

The construction and operation of my invention is described and illustrated in the accompanying specification and drawings, and the particular features of novelty are pointed out in the appended claims. In the drawings:

Fig. 1 is a side elevation of a conventional rotary saw blade equipped with detachable teeth in accordance with my invention.

Fig. 2 is a similar view of a tooth, detached, and

Fig. 3 is a bottom edge view of Fig. 2.

I have indicated at 1 a saw blade of conventional type and at 2 a plurality of detachable and replaceable tooth units in accordance with my invention and riveted or otherwise secured to the periphery of the saw blade, as indicated at 3.

Each tooth is of generally rectangular shape presenting an outer or cutting edge 4 which is developed on the arc of a circle substantially concentric to the axis of rotation of the saw blade, an inner or attaching edge 5 which is bifurcated to straddle the peripheral edge of the saw blade, as appears in Fig. 3, and a front edge 6 and a rear edge 7 disposed in substantially rectangular relation to the inner and outer edges of the tooth, and themselves preferably of tongue and groove form (see Fig. 3) so as to dovetail with the similar edges of the next adjacent teeth when the teeth are assembled on the blade, thereby presenting a solid unbroken tooth series with no gaps or spaces between adjacent teeth. This results in increased rigidity and strength, and prevents buckling or twisting of the teeth out of alinement with each other in the operation of the saw.

Each tooth is notched between its front and rear edges, as indicated at 8, to provide an abrasive pocket opening into the cutting edge 4 of the tooth, preferably at an angle thereto. As here shown, the notches 8 are curved and lead from the cutting edge 4 forwardly and inwardly, the resultant pocket thus being so shaped as to insure entrapment and retention of adequate abrasive therein.

I thus provide a blade with detachable teeth in which the front and rear edges of the teeth are radial to the axis of rotation of the disc, (as indicated by the radius lines R, Fig. 1) and are interlocked with each other so as to present maximum strength and rigidity, and in which the cutting edge of each tooth is notched to provide a re-entrant abrasive pocket intermediate of said interlocked front and rear edges.

By my construction, I provide a continuous cutting surface which can be worn down practically to the blade edge itself without appreciable loss of efficiency in cutting action. The location of the abrasive pocket in the cutting edge itself of the tooth insures that an adequate amount of abrasive will be maintained between the cutting edge of the tooth and the bottom of the saw kerf so long as any of the cutting surface remains, and the front and rear edge interlock of adjacent teeth reduces vibration and disalinement of teeth as well as imparting peripheral strength and rigidity to the teeth series as a whole.

Various modifications in the construction and operation of my device may obviously be resorted to if within the limits of the appended claims.

What I therefore claim and desire to secure by Letters Patent is:

1. In a rotary saw, a saw blade, and a plurality of saw teeth of generally rectangular shape, each tooth presenting front and rear edges disposed substantially radial to the axis of rotation of the blade and formed respectively with front and rear tongue and groove connections to connect interlockingly with the corresponding edges of the next adjacent teeth and having a pair of downwardly extending flanges adapted to straddle the rim of said saw blade and detachably connect said teeth to said blade.

2. In a rotary saw, a saw blade and a plurality of saw teeth each of said saw teeth having two downwardly extending flanges adapted to straddle the rim of said saw blade and means for detachably securing the same thereto, the remote end of each of said teeth being grooved and the forward end of each tooth having a tongue, said tongue adapted to connect interlockingly with the corresponding groove of the next adjacent tooth whereby said teeth present an unbroken cutting edge continuously about the periphery of the saw blade, an abrasive pocket in each of said teeth opening into the cutting edge of said teeth, said opening lying relatively near each rear edge of said tooth and extending forwardly therein to insure entrapment of the abrasive material whereby an adequate amount of abrasive will be maintained between the cutting edge of said teeth and the bottom of the saw kerf.

In testimony whereof I affix my signature.

DANIEL FREDRICK McGOVERN.